(12) United States Patent
McQuinn et al.

(10) Patent No.: US 6,708,631 B1
(45) Date of Patent: Mar. 23, 2004

(54) VARIABLE PAYLOAD TRACTOR VEHICLE WITH COORDINATED CROP INPUT MANAGEMENT SYSTEM

(75) Inventors: Charles A. McQuinn, Minneapolis, MN (US); Norman A. Bauer, Watertown, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 09/303,353

(22) Filed: Apr. 30, 1999

(51) Int. Cl.[7] .................................................. A01C 7/00
(52) U.S. Cl. ........................ 111/174; 111/903; 221/278; 221/211; 222/129; 222/52
(58) Field of Search ................................ 111/925, 130, 111/200, 149, 157, 163, 170, 174, 903, 120, 121, 14; 701/50; 221/211, 9, 10, 209, 278; 222/52, 53, 129, 627, 544

(56) References Cited

U.S. PATENT DOCUMENTS

| | | | | |
|---|---|---|---|---|
| 3,439,819 A | * | 4/1969 | Quanbeck | 111/925 X |
| 4,015,549 A | * | 4/1977 | Brown, Jr. | 111/925 X |
| 4,202,283 A | * | 5/1980 | Wiesboeck | 111/925 X |
| 4,264,023 A | * | 4/1981 | Stocks et al. | 222/614 |
| 4,319,856 A | * | 3/1982 | Jeppson | 404/79 |
| 4,473,016 A | * | 9/1984 | Gust | 111/925 X |
| 4,515,311 A | | 5/1985 | Takata | 239/172 |
| 4,566,553 A | * | 1/1986 | McCutcheon | 180/237 |
| 4,568,239 A | * | 2/1986 | Sims | 414/786 |
| 4,630,773 A | | 12/1986 | Ortlip | 239/1 |
| 4,723,787 A | * | 2/1988 | Hadley et al. | 280/411 |
| 4,881,751 A | * | 11/1989 | Torcomian | 280/457 |
| 5,220,876 A | | 6/1993 | Monson et al. | 111/130 |
| D351,843 S | | 10/1994 | Larson et al. | D15/13 |
| 5,355,815 A | | 10/1994 | Monson | 111/200 |
| D355,919 S | | 2/1995 | Larson et al. | D15/13 |
| 5,453,924 A | | 9/1995 | Monson et al. | 364/131 |
| RE35,100 E | | 11/1995 | Monson et al. | 111/130 |
| 5,689,418 A | | 11/1997 | Monson | 364/420 |
| 5,751,576 A | | 5/1998 | Monson | 364/188 |
| 5,757,640 A | | 5/1998 | Monson | 364/131 |
| 5,813,824 A | * | 9/1998 | Zanzig et al. | 414/786 |
| 5,870,686 A | | 2/1999 | Monson | 701/1 |
| 5,878,371 A | | 3/1999 | Hale et al. | 702/5 |
| 5,884,224 A | | 3/1999 | McNabb et al. | 702/2 |
| 5,887,491 A | | 3/1999 | Monson et al. | 74/864.74 |
| 5,947,040 A | * | 9/1999 | Gregor | 111/174 |
| 5,979,343 A | * | 11/1999 | Gregor et al. | 111/175 |
| 6,198,986 B1 | * | 3/2001 | McQuinn | 700/242 |

FOREIGN PATENT DOCUMENTS

NL  1002503  3/1996

OTHER PUBLICATIONS

Tractors and Their Power Units, Third Edition, Liljedahl et al., pp. 11–13, Dec. 1979.*
High Tech Farming Solution, Jun. 1998.
www.agchem.com/products/3104indu.htm, Terra–Gator 3104, Nov. 17, 1998, 1–5.

* cited by examiner

*Primary Examiner*—Victor Batson
(74) *Attorney, Agent, or Firm*—Troutman Sanders LLP; Ryan A. Schneider; Gerald R. Boss

(57) ABSTRACT

A variable payload towing vehicle with several storage containers for carrying bulk crop inputs. The storage containers are releasably attached to the vehicle and can be changed based on the type of crop inputs applied and any implements towed by the vehicle. The vehicle is also equipped with high flotation tires or tracks to minimize soil compaction. A delivery system in combination with a control system coordinates the movement of the crop inputs from the vehicle to places located off the vehicle. The vehicle may be equipped with articulated steering and all wheel steering to increase maneuverability.

13 Claims, 7 Drawing Sheets

VARIABLE PAYLOAD TRACTOR VEHICLE WITH COORDINATED CROP INPUT MANAGEMENT SYSTEM

CROSS-REFERENCE TO RELATED APPLICATION(S)

This application is related to U.S. Patent Application Pre-Charged Multi-Variable Rate Crop Input Applicator Machine, filed on same date, invented by Alvin E. McQuinn and assigned to Ag-Chem Equipment Co., Inc. of Minnetonka, Minn.

BACKGROUND OF THE INVENTION

This invention relates to a tractor vehicle used for site-specific farming. More particularly, this invention relates to a tractor vehicle configured to carry a payload of multiple crop inputs where the crop input storage containers are replaceable and exchangeable. With the payload on the vehicle, the weight of the crop inputs works for the vehicle rather than against it and reduces any need to add weight to the tractor. In addition, there is no need to tow a separate holding tank, which greatly reduces the turning radius required and decreases soil compaction. The vehicle is capable of carrying multiple crop inputs, resulting in fewer passes through the field with less machinery, which results in time and cost savings.

Typically a farmer performs several tasks to prepare a field for planting. First, the field is worked to prepare the soil for planting, which may include applying a fertilizer as well. Next, the seeds are planted. After seeding, other chemicals, such as fertilizer, insecticide, or herbicide, may also be applied. Each of these tasks involve driving a tractor vehicle through the field towing some type of implement. Each trip through the field results in soil compaction and costs both time and money.

In an attempt to increase efficiency and compete in the global market, farmers are increasingly turning to high technology to help them plant, fertilize, and apply chemicals in a manner that reduces costs while increasing yields. Precision farming uses a global positioning system (GPS), site specific maps, and computer systems on board the tractor vehicle to aid a farmer in applying the precise amount of crop inputs required by the soil conditions of a particular point in a field. More sophisticated precision farming systems can coordinate the application of multiple crop inputs so that the correct prescriptive mix is applied as required by soil conditions for a particular point in a field.

To apply multiple crop inputs, a farmer must tow a storage container full of crop inputs along with to the one or more implements already behind the tractor. In addition, farmers have moved to larger implements in an attempt to cover more ground in one pass and thus decrease the time it takes to work a field. The increase in the size and number of implements towed behind tractors, as well as the need to increase the size of tractors so that they are able to pull the larger implements or combinations of them, leads to more destruction of the soil and more compaction. It may be necessary to add additional weight to a tractor to achieve the necessary traction to pull the large implements and storage containers. The amount of soil compaction is increased because first the tractor causes soil compaction, and then any towed implements or storage containers cause soil compaction. Soil compaction prevents moisture penetration, reduces fertilizer and chemical utilization, and hinders root growth. Thus, less soil compaction means higher yields and the fewer wheels or tracks that follow the tractor the better.

Another result of the increasing size and number of implements pulled behind a tractor vehicle is that more room is required at the end of the row for the vehicle and implements to turn around. When several crop inputs are applied requiring several holding tanks to be towed behind the tractor, much more area must be left at the end of the field for the tractor, implements, and tanks to turn around. This area used for turning is not worked, and must be covered in another pass around the perimeter of the field. When the turning radius of the vehicle and implements is large, it may take more than one perimeter pass to cover the unworked ground, which takes much more time. A further problem with such a large turn radius is that it makes it more difficult to start the next row without missing some ground or overlapping ground already covered.

Time is also spent filling the crop input containers each time they are emptied. This may require a farmer to unload seed bags or otherwise keep a supply of crop inputs nearby for refilling the holding tanks as they become empty. This becomes even more time consuming and tedious when multiple crop inputs are applied at different rates, which may cause the farmer to stop and refill different crop inputs at different times, greatly slowing the application process. For instance, when seeding corn, a planter can hold about two bags of seed per planter box. If a planter plants one corn kernel about every 7 inches, and the vehicle pulling the planter is moving at about 5 miles per hour, this means refilling each box every 90 acres, or about every 5 hours. In doing so, a farmer must handle at least 24 bags of 40 pound seed each time.

It may also be desirable to apply a fertilizer or insecticide at the same time as planting. However, for a planter to do so requires the planter boxes to be reduced in size to allow room for the fertilizer or insecticide applicators. Smaller planter boxes are emptied faster, and require a farmer stop to refill them more often. If not applied by the planter implement, fertilizer or insecticide may be applied using a separate implement, which often requires an accompanying storage container to hold the fertilizer or insecticide. This container must likewise be refilled when emptied. This process is time consuming and tedious, and results in a long "mule train" including a planter, a towed implement, and often a towed storage bin, all of which lead to soil compaction and require a large towing tractor.

Planting beans causes the same type of problems. Nine or ten beans are planted every foot, which means the planter boxes are emptied much faster than when planting corn. Because the planter boxes must be refilled so often, farmers have begun to use caddies to carry bean seed and refill the planter boxes as they become emptied. The towed caddy causes more soil compaction and adds to the length of the towed system. In addition, towed caddies make it much more difficult to move the planter into corner areas and thus start planting in the corner of a field.

Multi-compartment seeding creates a complexity that discourages the practice of applying multiple products in one pass, which is more efficient and causes less soil compaction or disruption. Currently, farmers are limited in their ability to apply multiple crop inputs during planting because of the lack of multi-compartment planters and constraints caused by trying to keep such a planter full of crop inputs. Farmers are further limited by a lack of vehicles equipped to tow such a planter.

Accordingly, there is a need in the farming industry for a tractor vehicle that can accommodate the application of multiple crop inputs and avoid the downtime associated with refilling a crop input applicator by carrying a much larger payload, while also reducing soil compaction and turning radius. Likewise, there is a need for a tractor vehicle that can carry a large payload of multiple crop inputs, where the increased weight works for the tractor rather than against it by decreasing the horsepower needed and increasing fuel economy. It is a significant improvement in the art for such a vehicle to be equipped with the latest technology for precision farming.

BRIEF SUMMARY OF THE INVENTION

The present invention answers the need in the agricultural industry for a tractor vehicle that reduces soil compaction and turning radius, and yet is able to apply multiple crop inputs in one pass. The variable payload towing vehicle carries multiple storage containers for holding bulk crop inputs. In addition, the vehicle is equipped with high flotation tires to reduce soil compaction. Because the vehicle is designed to work as a tractor and tow various crop input applicators and other implements, the vehicle has a hitch and a delivery system for moving the crop inputs from the storage containers to the towed implement. The delivery system allows the vehicle to pre-charge any towed implements with crop inputs so that a farmer need to make several stops to refill an implement.

The multiple containers on the rear section of the towing vehicle allow the vehicle to carry the payload, rather than towing a separate holding tank behind it for the crop inputs being applied. Once located on the tractor, the payload works for the tractor rather than against it because less fuel is consumed and less horsepower is needed to pull the implement or crop input applicator.

The multiple containers carried on the rear of the towing vehicle are removable and changeable. This increases the flexibility for farmers in that multiple crop inputs can be applied in one pass without needing to tow other implements. Likewise, farmers can choose the type of containers that best meet their needs based on the type of towed implement and the type of crop inputs to be applied. The containers can carry a combination of wet or dry or both crop inputs, including insecticide, herbicide, fungicide, liquid fertilizer, seeds, granular fertilizer, or any other crop input necessary to facilitate crop growth. The containers have a large capacity, which increases efficiency by eliminating the need to stop and refill implements which have a smaller capacity. Thus, farmers do not have to struggle with bags of seed or jugs of chemical.

To further decrease soil compaction, the tractor vehicle may be equipped with all wheel steering and a steerable articulated joint. Such a configuration allows for crab steering, where the rear wheels do not travel in the same track as the front wheels. Because the rear wheels and front wheels do not share the same track, the soil compaction occurring in each track is decreased. The articulated joint along with the steerable rear wheels likewise helps to turn the towing vehicle more sharply at the end of a row and make it possible to start the next row with little or no miss or overlap.

The vehicle has a control system to control the application of multiple crop inputs as a function of the position of the vehicle in the field and a map defining the desired crop inputs for various positions in the field. To accomplish this, the control system uses a locating system, such as GPS, and site specific soil condition data, along with software to coordinate the delivery mechanism on the vehicle so that the desired amount and prescription of crop inputs are placed at the correct point in the field.

DETAILED DESCRIPTION

Figure 1:
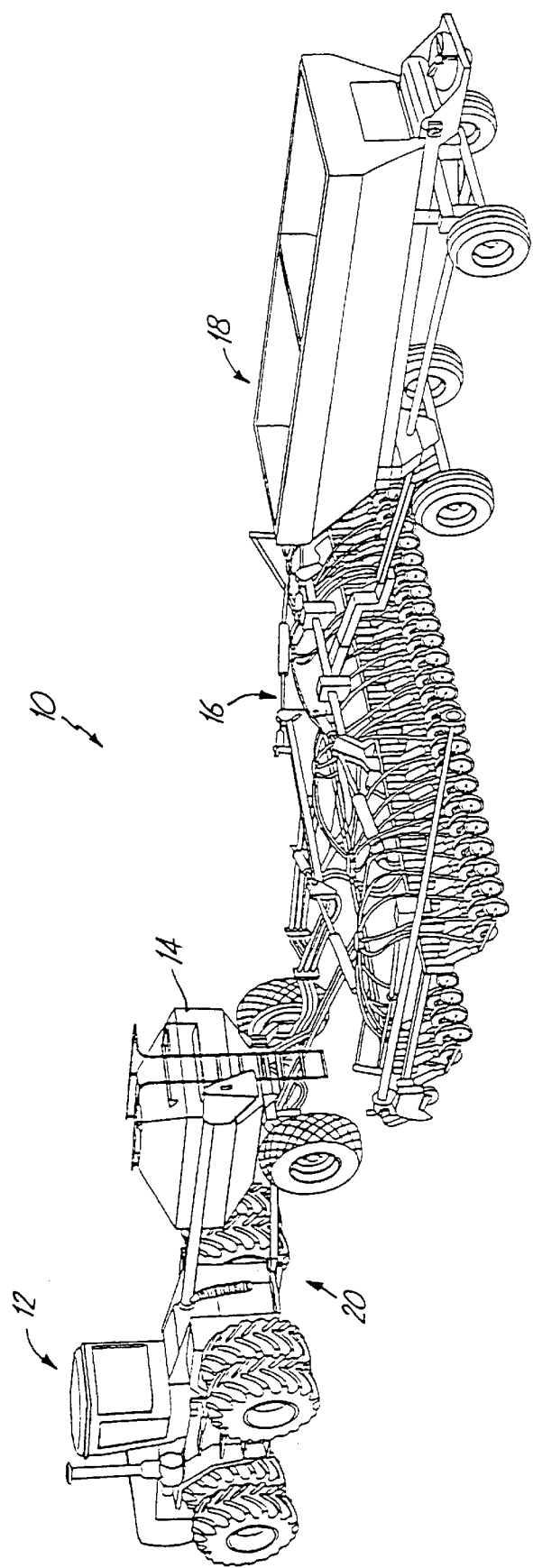
FIG. 1 is a perspective view of a prior art tractor vehicle having multiple towed crop input storage tanks and a crop input applicator implement attached to a hitch.

FIG. 1 is a perspective view of a prior art crop input applicator system 10 including a tractor vehicle 12, a towed storage bin 14, a seeding implement 16, and a towed spreader 18. The towed storage bin 14 is attached to the tractor vehicle 12 by a hitch 20 in a manner well known to those skilled in the art. The storage bin 14 and the towed spreader 18 both carry crop inputs. The storage bin 14 is used to supply crop inputs, such as seed or fertilizer, to the planting implement 16. The spreader 18 is used to apply a different type of crop inputs off the rear at the spreader 22. This system 10 is typical of site specific planting practices, where it is common to require simultaneous transportation of several crop inputs (seed, bulbs, fertilizer, herbicide, insecticides, and fungicides) and applicators (planters, spreaders, toolbars, and storage tanks) to achieve several operations in one pass. As can be seen, the amount of soil compaction generated by the tractor 12, the storage bin 14, the implement 16, and the spreader 18 can be significant due to the number of towed items that must traverse the soil.

Figure 2:
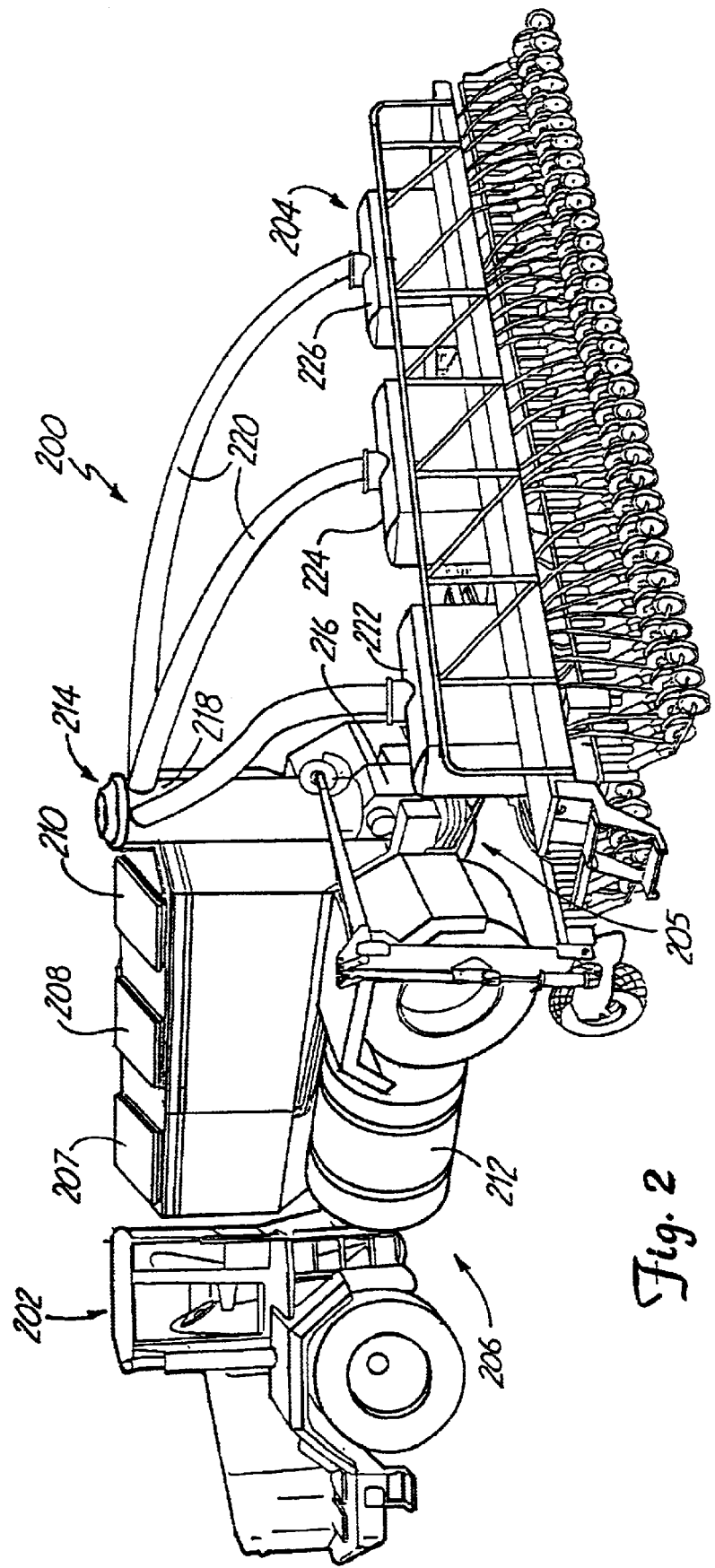
FIG. 2 is a perspective view of a variable payload towing vehicle having an articulated frame, a variable dry/wet payload system and having a coordinated crop input applicator implement attached to a hitch to apply selected crop inputs in accordance with one preferred embodiment of the present invention.

FIG. 2 shows an improvement in the art in that the bulk crop inputs are moved from behind the tractor vehicle, on to the tractor vehicle. FIG. 2 depicts a crop input application system 200. The crop input application system 200 includes a variable payload towing vehicle 202 towing a crop input applicator 204, which is attached to the vehicle 202 by a hitch 205. The system 200 reduces the need for the "mule train" set up shown in FIG. 1 because the variable payload towing vehicle 202 carries the payload of crop inputs on its chassis 206 rather than towing the crop inputs on separate items behind it.

The variable payload towing vehicle 202 carries several crop inputs in a series of primary containers 207, 208, 210.

These primary containers 207, 208, 210, are configured to hold dry crop inputs, such as seed, bulbs, granular fertilizer, and other types of dry fertilizer, herbicide, or insecticide. In addition to the dry containers 207, 208, 210, the towing vehicle 202 is also configured with a side primary container 212 capable of holding wet crop inputs. The wet primary container 212 can be used for such things as liquid fertilizer, liquid herbicide, liquid insecticide, liquid fungicide, or other such liquid crop inputs. It is also possible to equip the towing vehicle 202 with other types of crop input containers, such as an anhydrous ammonia tank.

The contents of the dry primary containers 207, 208, 210, and the wet primary container 212 are moved via a delivery system 214. The delivery system 214 of the current embodiment is an air assisted transport system comprising a fan system 216, an auger 218, and flow tubes 220. The delivery system 214 transports the crop inputs from the wet or dry primary containers 207, 208, 210, 212, to a towed implement 204. Air pressure generated by the fan system 216 moves crop inputs to the auger 218, which transports the crop inputs to flow tubes 220. From the flow tubes 220, the crop inputs are moved to the towed implement 204, which in this case is a planter. At the implement 204, the crop inputs are taken to secondary containers 222, 224, 226, where they are dispensed to the agricultural field. The delivery system 214 shown in FIG. 2 is only one of a variety of delivery systems available. Other options for the delivery system 214 include a system of augers, conveyer belts, spray booms, meters, dry spreaders, pumps, or a combination thereof.

The secondary containers 222, 224, 226 on the implement 204 are substantially smaller than the primary containers 207, 208, 210, and 212 on the vehicle 202. Typically, the capacity of the primary containers 207, 208, 210, and 212 on the vehicle 202 are at least twice the capacity of the secondary containers 222, 224, 226 on the implement 204. More preferably, the capacity of the primary containers 207, 208, 210, and 212 is five times or more than the capacity of the secondary containers 222, 224, 226. In all, the capacity of the primary containers 207, 208, 210, and 212 on the vehicle 202 may be as high as about 28,000 pounds to about 30,000 pounds.

As can be seen, one of the major benefits of the variable payload vehicle 202 is its ability to carry large quantities of multiple crop inputs and dispense them to an implement 204. Because of this large capacity, the variable payload vehicle 202 is a significant improvement in the art in that it does not require a farmer to stop and struggle with bags of seed or jugs of chemical to maintain a full supply of multiple crop inputs. While previous implements were limited in both the size and number of secondary containers 222, 224, 226 carried on the implement, the present invention greatly increases the flexibility of the type of towed implement 204 and the number of secondary containers 222, 224, 226 used by that towed implement 204. Because the inventive vehicle 202 is capable of carrying such a large capacity of several crop inputs, the implement 204 may be configured to apply multiple crop inputs without needing numerous or large secondary storage containers 222, 224, 226. The small containers 222, 224, 226 can be refilled as necessary by the vehicle 202 and thus need not be so large the implement 204 becomes unwieldily and causes soil disruption.

Another major benefit of the present invention is that it reduces soil compaction. As can be seen by comparing the prior art method of applying crop inputs illustrated in FIG. 1 to the inventive method of applying crop inputs illustrated FIG. 2, once the payload of crop inputs is moved to the vehicle, the need to tow separate crop input holding tanks behind the vehicle is eliminated. Because each item that must be towed behind the vehicle causes soil compaction, eliminating one or more towed storage tanks results in much less soil compaction. Once soil becomes compacted, water penetration is reduced, fertilizer and chemical utilization is reduced, and root growth is greatly hindered. Thus avoiding soil compaction results in much healthier plants and much higher yields.

Figure 3:
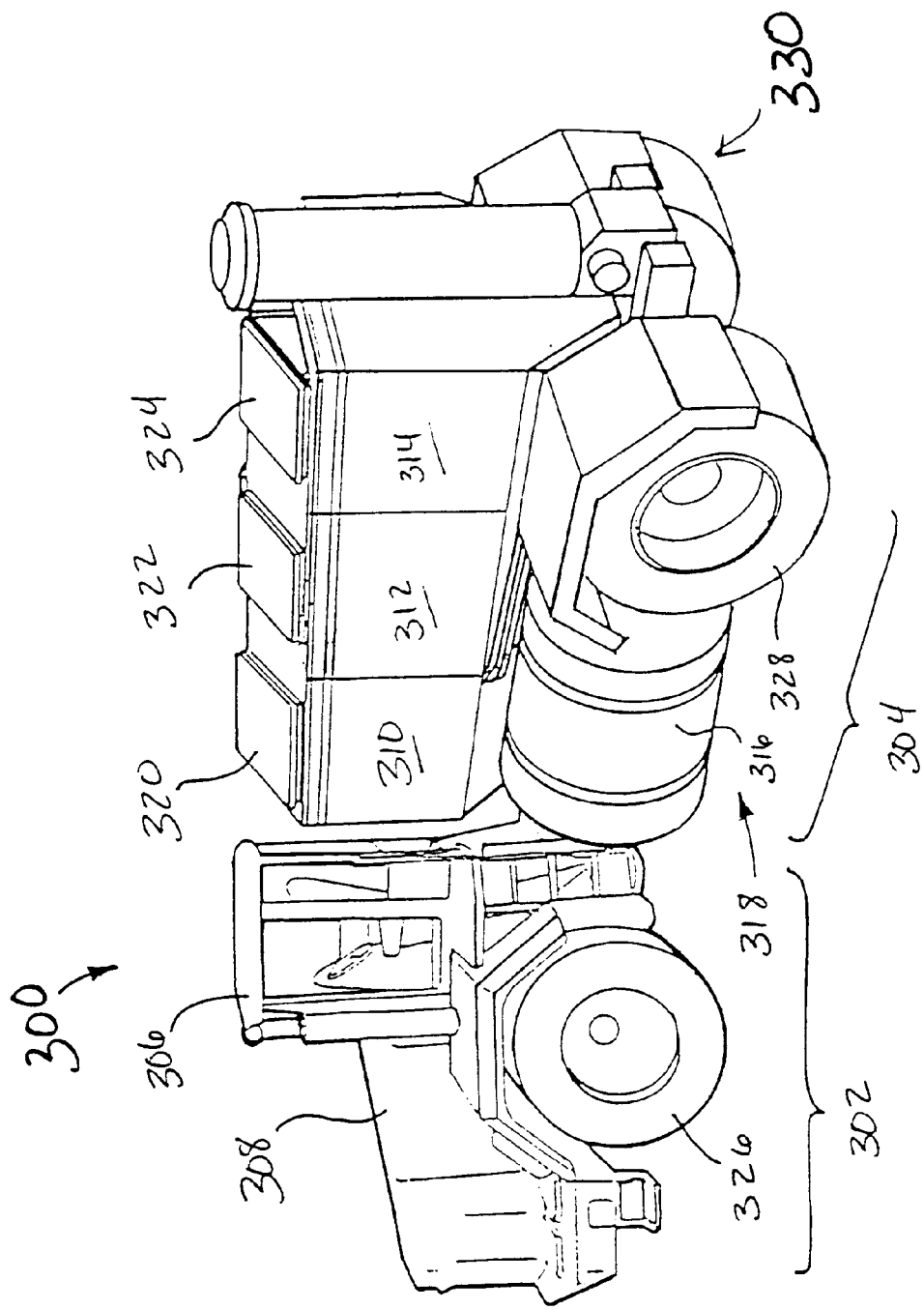
FIG. 3 is a perspective view of a variable payload towing vehicle with an articulated frame and a variable dry/wet payload system.

FIG. 3 shows a variable payload towing vehicle 300 without a towed implement to highlight its bulk crop input carrying capacity and low impact on soil compaction. The vehicle 300 consists of a front section 302 and a rear section 304. The front section 302 carries the cab 306 and the engine compartment 308. The rear section 304 carries the dry crop input containers 310, 312, 314, and a wet crop input container 316. All the containers 310–316 on the rear section 314 are releasably attached to the chassis 318. In this manner, the containers 310–316 are changeable and offer a farmer increased flexibility to vary containers 310–316 depending on the type of crop input applicator used and the type of crop inputs being applied. Access to the dry containers 310, 312, and 314, is through container covers 320, 322, 324, where crop inputs can be loaded.

Notably, the towing vehicle 300 is equipped with high floatation tires 326 and 328. High flotation tires 326 and 328 further aid in reducing soil compaction. Other configurations assuring low impact on the soil include equipping the towing vehicle 300 with tracks or a combination of tracks and high flotation tires. Both high floatation tires and tracks are well known to those skilled in the art. In addition, because the vehicle 300 is designed to be used in connection with a towed implement, the vehicle 300 is equipped with a hitch 330.

Figure 4A:
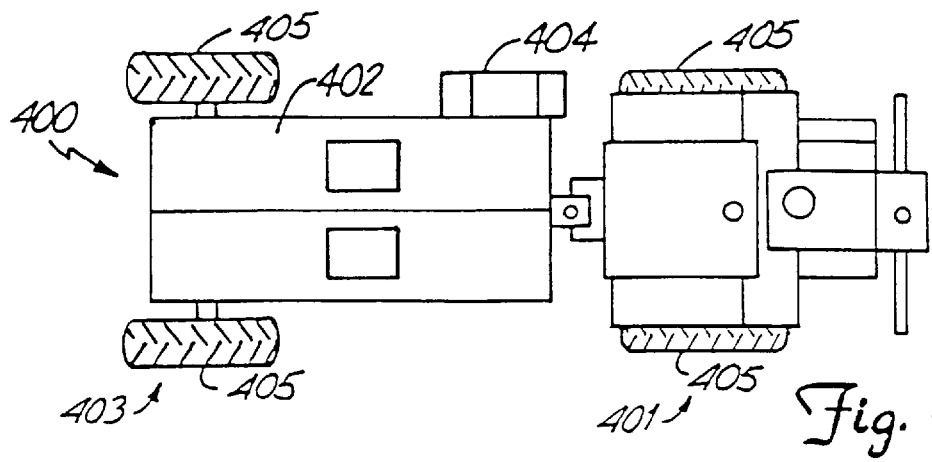
FIG. 4A is a top view of a variable payload vehicle illustrating a single bin capacity and a side wet tank.
Figure 4B:
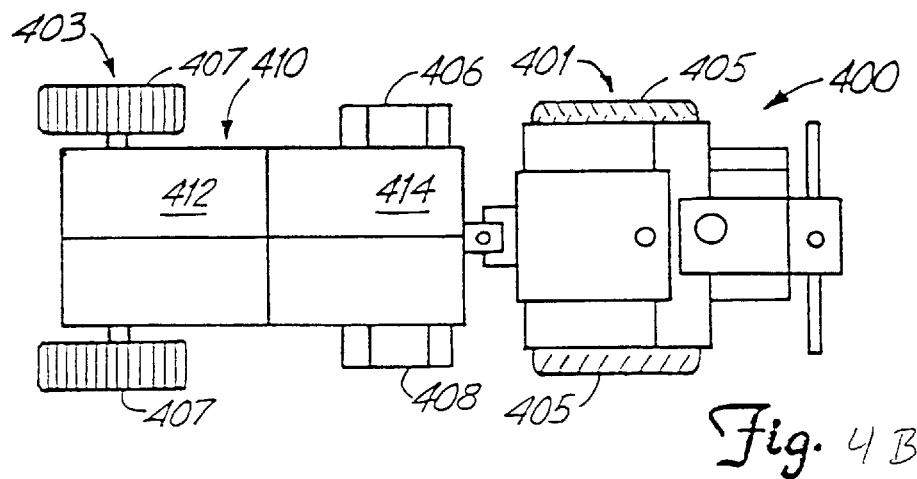
FIG. 4B is a top view of a variable payload vehicle illustrating a twin bin capacity and dual side wet tanks.

Though the preferred embodiment shown in FIG. 3 illustrates three dry containers 310, 312, 314, and one wet container 316, because the containers are removable and changeable, it is possible for the vehicle to be configured with several different combinations of containers. For instance, FIG. 4A is a top view of a variable payload vehicle 400 showing that instead of containing three separate dry containers, the variable payload towing vehicle is configured with one large container 402, and still carries one side tank 404 for wet crop inputs. In addition, as depicted in FIG. 4B, it is possible to operate the towing vehicle 400 with two wet tanks 406 and 408 and a twin bin 410 with a first compartment 412 and a second compartment 414 for dry crop inputs. Unlike the storage containers shown in FIGS. 2 and 3, the twin bin shown in FIG. 4B is not enclosed, allowing easy access from any point above the bins and eliminating a need for access covers. In still another configuration, FIG. 4C indicates a vehicle without any wet tanks, but with three bins 416, 418, and 420 for dry crop inputs. It is also possible to mount an anhydrous ammonia tank on the chassis.

Figure 4C:
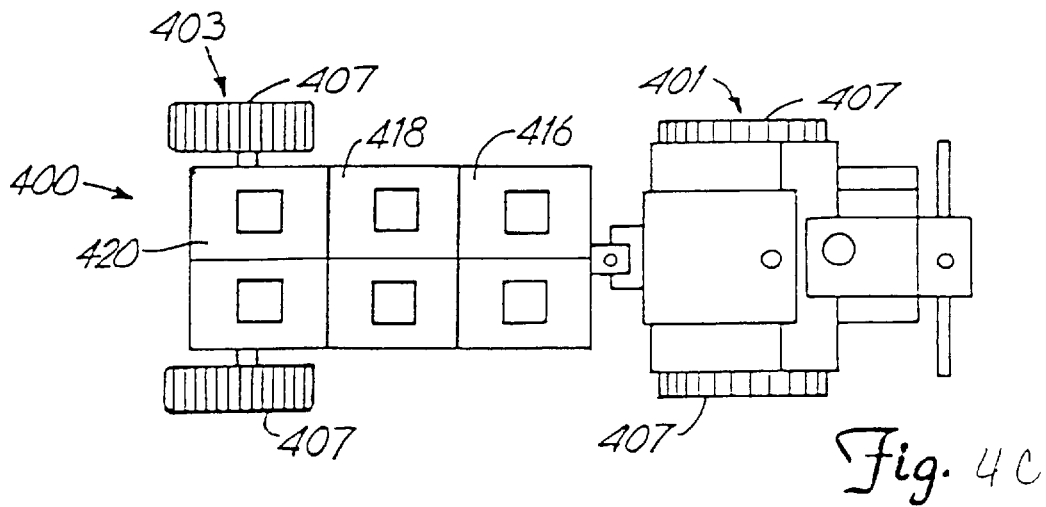
FIG. 4C is a top view of a variable payload vehicle illustrating a three bin capacity with no side wet tanks.

Also visible in FIGS. 4A–4C are different configurations of low impact tires or tracks that can be utilized to ensure the vehicle 400 causes as little soil disruption as possible. FIG. 4A shows a variable payload vehicle 400 with high flotation tires 405 on both the front wheels 401 and rear wheels 403. FIG. 4B shows a variable payload vehicle 400 with both tires 405 and tracks 407. In FIG. 4B, the vehicle 400 is equipped with high flotation tires 405 on the front wheels 401 and tracks 407 on the rear wheels 403. Another configuration is shown in FIG. 4C, where the vehicle 400 is equipped with tracks 407 on the front wheels 401 and rear wheels 403. Other combinations of tires and tracks are also possible. For instance, when both tires 405 and tracks 407 are used on a vehicle it is most preferred to have tracks 407 on the rear wheels 403. It is also possible to have a combination of tires 405 and track 407 wherein the tracks 407 are placed on the front wheels 401 and the tires 405 are placed on the rear wheels 403.

Figure 5A:
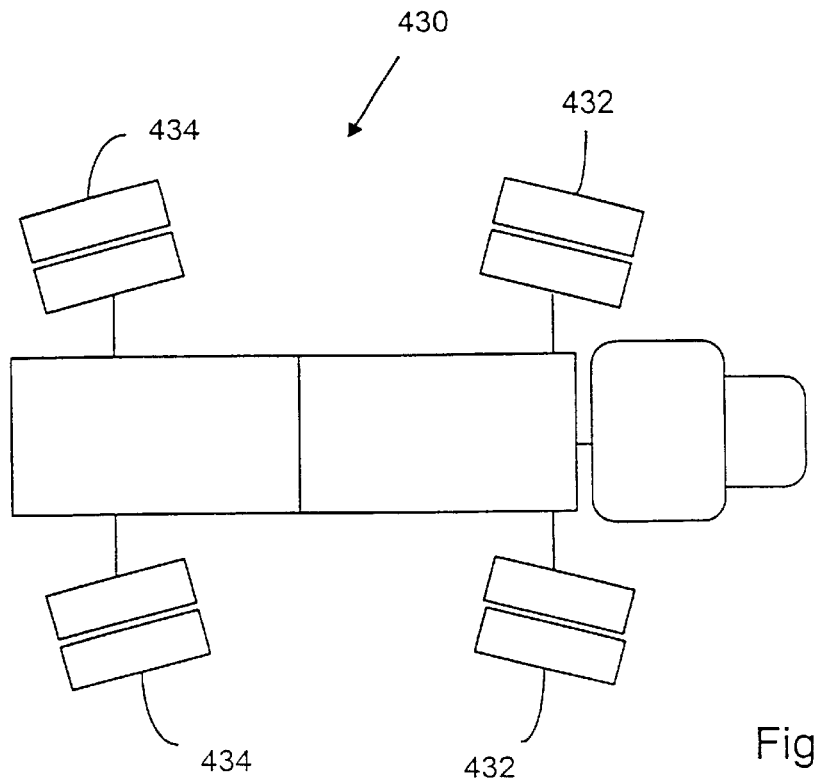
FIG. 5A is a top view of a variable payload towing vehicle having eight wheels.
Figure 5B:
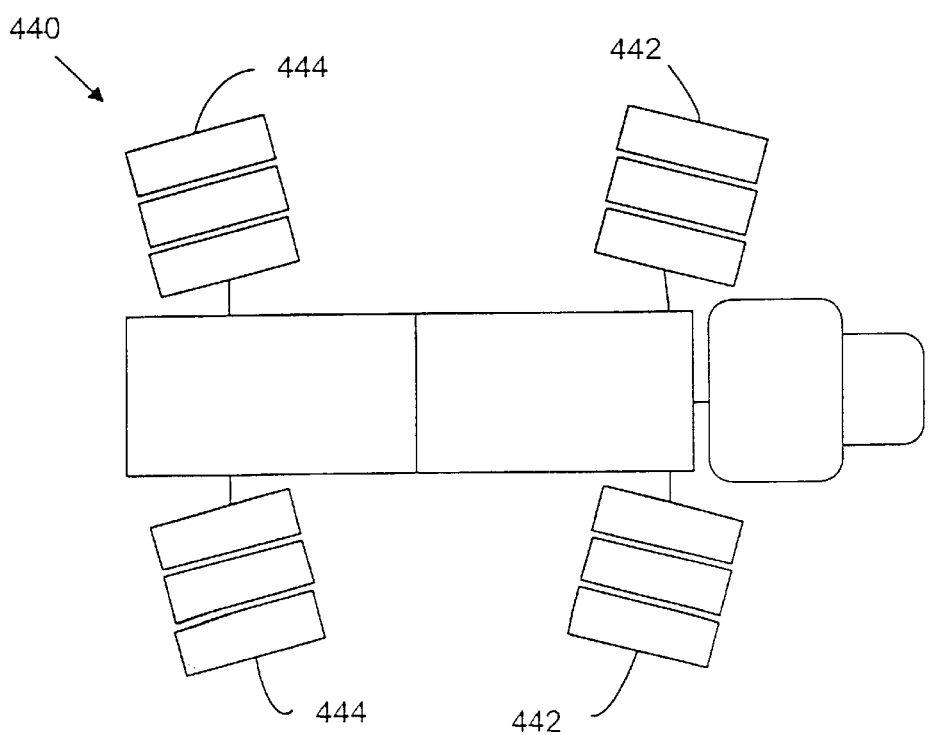
FIG. 5B is a top view of a variable payload towing vehicle having twelve wheels.

Though the embodiments shown in FIGS. 2–4C all have four wheels, the variable load carrying vehicle may have a variety of wheel configurations; the vehicle may be four wheeled, eight wheeled, or even twelve wheeled. FIG. 5A shows a top view of a variable load carrying vehicle with eight wheels. The vehicle 430 has dual wheels 432 on the front and dual wheels 434 on the rear of the vehicle. FIG. 5B shows a variable load carrying vehicle 440 equipped with twelve wheels. The vehicle 440 has front triple wheels 442 and rear triple wheels 444. Other combinations of dual or triple wheel configurations are also possible, such as having duals or triples only on the rear wheels, or having duals on the front wheels and triples on the rear wheels.

Figure 6:
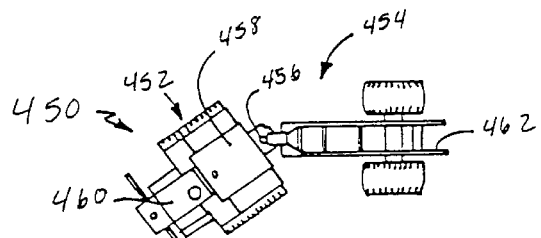
FIG. 6 is a top view of a variable payload towing vehicle with an articulated frame and a bare chassis.

FIG. 6 is a top view of one embodiment of an articulated variable payload vehicle 450. The vehicle has a front section 452 and a rear section 454 connected by an articulated joint 456. A cab 458 and engine 460 are placed on the front section 452. The rear section 454 is configured to accept a variety of storage containers, but in FIG. 6 is with a bare chassis 462. The articulated joint 456 used between the front section 452 and rear section 454 is commonly known to those skill in the art. FIG. 6 illustrates how the articulated joint 456 acts as the pivot point for the towing vehicle 450. Having an articulated joint 456 makes the present embodiment even more capable of reducing soil compaction, and increases maneuverability of the vehicle 450.

Figure 7A:
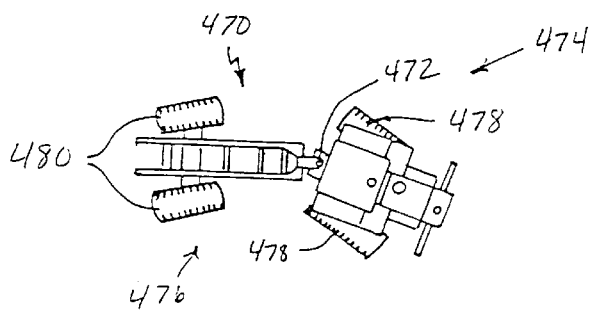
FIGS. 7A and 7B are top views of a variable payload towing vehicle with an articulated frame and illustrating articulated and all wheel steering.
Figure 7B:
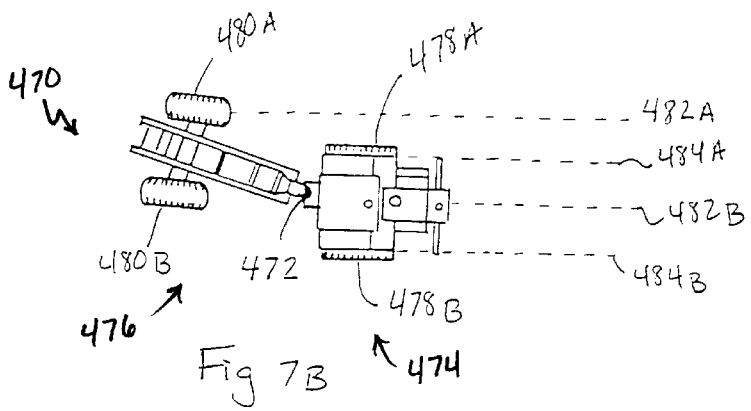

FIGS. 7A–7B show a top view of one embodiment of an articulated towing vehicle 470 illustrating an optional steering system that can be used to further reduce soil compaction. FIG. 7A shows an articulated variable payload towing vehicle 470 with articulated joint 472. The joint 472 includes of a pair of actuators that pivot the joint allowing the front section 474 to move relative to the rear section 476. In addition, the towing vehicle 470 has steerable front wheels 478 and steerable rear wheels 480. All wheel steering gives the towing vehicle 470 a much tighter turning radius and improves the maneuverability of the vehicle 470 on hillsides. When on a steep hill, the rear of the vehicle 470 or towed implements may begin to slip downhill. With all wheel steering, the rear wheels 480 can be steered to keep this slippage to a minimum. This steering system can be used on vehicles 470 that do not have an articulated joint 472 as well.

FIG. 7B shows another beneficial feature of all wheel steering on the vehicle 470, namely reduced soil compaction. In FIG. 7B, the front wheels 478A, 478B have been steered so that the front section 474 travels in tracks 484A, 484B. In addition, the rear wheels 480A, 480B have been steered so that the rear section 476 of the vehicle 470 travels in tracks 482A, 482B. This type of steering, called crab steering or dog walk steering, is beneficial because the front wheels 478A, 478B do not travel in the same tracks 484A, 484B as the rear wheels 480A, 480B. By creating four tracks 482A–482B, 484A–484B instead of two, the soil compaction caused by the vehicle 470 is greatly reduced.

To accommodate site specific farming practices, the variable payload towing vehicle 470 and any towed implement are configured with a control system. Site specific farming involves collecting soil condition data (such as through soil sampling done with the aid of a GPS system). The resulting site specific data can be used to create maps indicating soil conditions or requirements. The control system responds to such site specific data and allows the crop input application system to prescriptively and at a variable rate apply multiple crop inputs from the implement to an agricultural field at desired points in the field and at desired prescriptive amounts. A prescriptive application of crop inputs arises when multiple crop inputs are being applied simultaneously. When applying multiple crop inputs, the correct amount of each individual crop input is applied at the desired rate so that the total application of multiple crop inputs is achieved at the desired prescriptive amount. One such control system capable of achieving a prescriptive application of multiple crop inputs is the FALCON controller manufactured by Ag-Chem Equipment Co. of Minnetonka, Minn.

Figure 8:
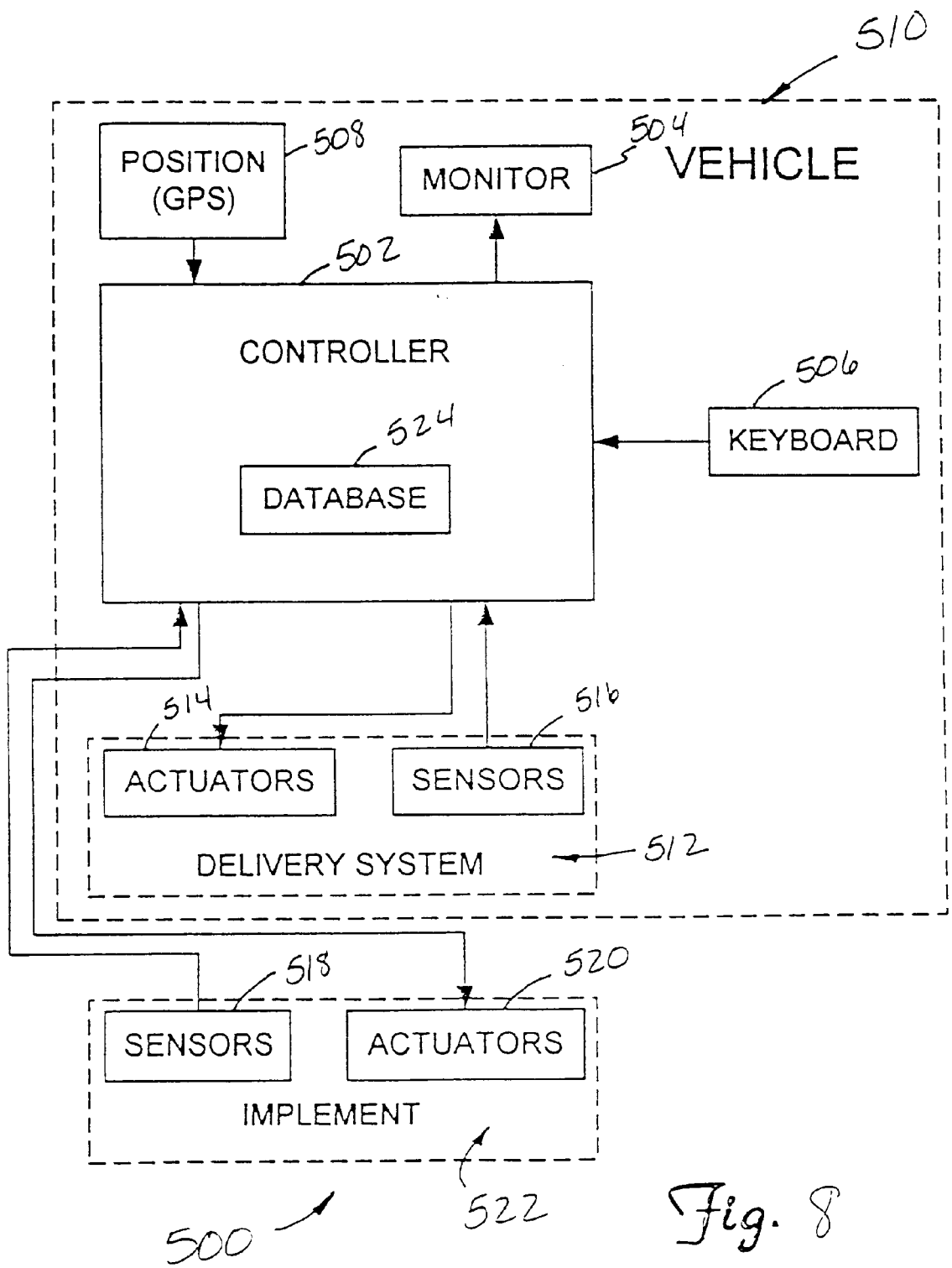
FIG. 8 is a graphical representation of a control system architecture for use with the present invention.

FIG. 8 illustrates a control system architecture 500 for use with the present invention. The control system architecture 500 is comprised of a controller 502 which displays information via a monitor 504 and receives data inputs from a user via a keyboard 506. To control the application of crop inputs based on a particular geographic location, the controller 502 is also in contact with a position locator 508, such as a GPS system. The controller 502, monitor 504, keyboard 506, and position locator 508 all reside on the vehicle 510.

Also on the vehicle 510 is a delivery system 512. The delivery system comprises actuators 514 and sensors 516. As explained above, the delivery system 512 can be either air assisted, conveyor belts, flow tubes, augers, or other suitable devices. To activate the delivery system 512, the controller 502 sends a signal to the actuators 514. Actuators 514 are typically valves, motors, or hydraulic or pneumatic controls. By controlling the actuators 514, the controller 502 can control the delivery of crop inputs from the vehicle 510. Sensors 516 are utilized to notify the controller 502 in the event of an element of the delivery system 512 not functioning correctly. Sensors 516 an also be used to communicate the level of crop inputs in the primary crop input containers held on the vehicle 510 or towed by it. Sensors 516 may include a system of lights or tones which alert a user to problems.

There are likewise actuators 518 and sensors 520 on the implement 522. Once again, the actuators 518 are typically valves, motors, or hydraulic or pneumatic controls that the controller 502 controls to apply the desired amount of crop inputs. Sensors 518 notify the controller of any abnormalities in the operation of the implement 522. Sensors 518 can also be used to communicate the level of crop inputs in storage containers located on the implement 522.

The controller 502 is able to utilize soil condition data stored in a database 524 to control the actuators 514 and sensors 516 of the delivery system 512 and move the desired amount of multiple crop inputs stored on the vehicle 510 to the desired location given by the position locator 508. The same soil condition data from the database 524 is used by the control system 500 to coordinate the sensors 518 and actuators 520 on the implement 522 to assure the desired amount of multiple crop inputs are applied at the desired prescriptive variable rate to the desired location given by the position locator 508. In this manner, the controller 502 is able to apply multiple crop inputs by coordinating the delivery of multiple crop inputs from primary storage containers on the vehicle 510 to the secondary containers on the implement 522 so that the crop inputs are applied at the desired rate and at the desired prescriptive amount.

Although the present invention has been described with reference to preferred embodiments, workers skilled in the art will recognize that changes may be made in form and detail without departing from the spirit and scope of the invention.

What is claimed is:

1. An agricultural system for application of crop inputs to a field, the system comprising:
   a variable payload towing vehicle comprising a plurality of primary crop input storage containers and low impact ground engaging mean;
   a crop input applicator implement coupled to the towing vehicle, the implement comprising a plurality of secondary crop input storage containers, wherein a capacity of the primary storage containers on the towing vehicle is greater than a capacity of the secondary containers on the implement;
   a control system associated with the towing vehicle and applicator implement that controls a flow of crop inputs from the primary storage containers on the towing vehicle to the secondary storage containers on the implement, controls a rate of release of crop inputs from the crop input applicator implement, and coordinates an application of multiple crop inputs so that the crop inputs are applied at a prescriptive rate; and
   a delivery system configured to move crop inputs from the primary storage containers on the vehicle to the secondary storage containers on the applicator implement.

2. The system of claim 1 wherein the crop input implement is a planter.

3. The system of claim 1 wherein at least one primary crop input storage container on the towing vehicle carries liquid crop inputs.

4. The system of claim 1 wherein at least one primary crop input storage container on the towing vehicle carries dry crop inputs.

5. The system of claim 1 wherein the low impact ground engaging means on the towing vehicle is a plurality of high flotation tires.

6. The system of claim 1 wherein the delivery system is air assisted.

7. The system of claim 1 wherein the control system compensates for time it takes to move the crop inputs from the primary storage containers on the towing vehicle to the secondary storage containers on the implement.

8. The system of claim 1 wherein the control system is configured to control the application of multiple crop inputs from the implement as a function of the position of the vehicle in a field and site specific data which defines a prescription designed multiple crop inputs for various positions in the field.

9. The system of claim 1 wherein the control system includes a plurality of sensors and actuators on the implement to communicate a crop input level on the implement to the towing vehicle.

10. The system of claim 1 wherein the capacity of the primary crop input storage containers on the vehicle is at least twice the capacity of the secondary crop input store containers on the implement.

11. The system of claim 1 wherein the capacity of the primary crop input storage containers on the vehicle is about five times the capacity of the secondary crop input storage containers on the implement.

12. The system of claim 1 wherein the capacity of the primary crop input storage containers on the vehicle is greater than about 25,000 pounds.

13. A variable payload towing vehicle, the vehicle comprising:
    a plurality of storage containers for holding bulk crop inputs on a chassis;
    low impact ground engaging means;
    a delivery system for moving the crop inputs from the storage containers to a towed implement;
    a control system configured to control an application of multiple bulk crop inputs from the towed implement as a function of the position of the vehicle in a field and site specific data so that a prescription of desired crop inputs is applied at a desired positioned in the field; and
    a hitch on the chassis for towing an implement.

* * * * *